(12) United States Patent
Park et al.

(10) Patent No.: US 12,331,370 B2
(45) Date of Patent: Jun. 17, 2025

(54) GRAIN-ORIENTED ELECTRICAL STEEL SHEET AND MANUFACTURING METHOD THEREFOR

(71) Applicant: POSCO, Pohang-si (KR)

(72) Inventors: Chang-Soo Park, Pohang-si (KR); Kyu-Seok Han, Pohang-si (KR); Jin-Wook Seo, Pohang-si (KR); Yu-Jun Bak, Pohang-si (KR)

(73) Assignee: POSCO, Pohang-si (KR)

( * ) Notice: Subject to any disclaimer, the term of this patent is extended or adjusted under 35 U.S.C. 154(b) by 510 days.

(21) Appl. No.: 17/786,267

(22) PCT Filed: Dec. 15, 2020

(86) PCT No.: PCT/KR2020/018330
§ 371 (c)(1),
(2) Date: Jun. 16, 2022

(87) PCT Pub. No.: WO2021/125738
PCT Pub. Date: Jun. 24, 2021

(65) Prior Publication Data
US 2023/0029310 A1    Jan. 26, 2023

(30) Foreign Application Priority Data
Dec. 18, 2019   (KR) .................. 10-2019-0169752

(51) Int. Cl.
| | | |
|---|---|---|
| *C21D 8/02* | (2006.01) | |
| *C21D 1/26* | (2006.01) | |
| *C21D 6/00* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |

(52) U.S. Cl.
CPC ............. *C21D 8/0273* (2013.01); *C21D 1/26* (2013.01); *C21D 6/008* (2013.01); *C21D 8/0226* (2013.01); *C21D 8/0236* (2013.01); *C21D 8/0284* (2013.01); *C21D 9/46* (2013.01); *C22C 38/001* (2013.01); *C22C 38/004* (2013.01); *C22C 38/02* (2013.01); *C22C 38/04* (2013.01); *C22C 38/06* (2013.01); *C21D 2201/05* (2013.01)

(58) Field of Classification Search
CPC ........ C21D 8/0273; C21D 1/26; C21D 6/008; C21D 8/0226; C21D 8/0236; C21D 8/0284; C21D 1/74; C21D 3/04; C21D 8/1205; C21D 8/1222; C21D 1/60; C21D 1/76; C21D 8/1233; C21D 8/1244; C21D 8/1255; C21D 8/1261; C21D 8/1272; C21D 1/68; C21D 9/46; C21D 2201/05; C21D 8/1283; C22C 2202/02; C22C 38/001; C22C 38/004; C22C 38/02; C22C 38/04; C22C 38/06; B21B 1/24; B21B 3/00
See application file for complete search history.

(56) References Cited

U.S. PATENT DOCUMENTS

| | | | |
|---|---|---|---|
| 5,885,371 A | | 3/1999 | Komatsubara et al. |
| 6,039,818 A | * | 3/2000 | Toge ..................... C21D 8/1233 148/307 |
| 6,562,473 B1 | | 5/2003 | Okabe et al. |
| 2004/0231752 A1 | * | 11/2004 | Nanba ..................... C22C 38/02 148/307 |
| 2012/0013430 A1 | | 1/2012 | Morishige et al. |
| 2013/0306202 A1 | | 11/2013 | Joo et al. |
| 2014/0338794 A1 | * | 11/2014 | Shingaki ................. C22C 38/60 148/111 |
| 2018/0327879 A1 | | 11/2018 | Song et al. |
| 2019/0010572 A1 | | 1/2019 | Han et al. |
| 2019/0085423 A1 | | 3/2019 | Hayakawa et al. |
| 2019/0309387 A1 | | 10/2019 | Park et al. |
| 2020/0032363 A1 | | 1/2020 | Ko et al. |
| 2021/0130937 A1 | | 5/2021 | Han et al. |

FOREIGN PATENT DOCUMENTS

| | | |
|---|---|---|
| CN | 1308143 A | 8/2001 |
| CN | 103534366 A | 1/2014 |
| CN | 104674136 A | 6/2015 |

(Continued)

OTHER PUBLICATIONS

Ko Kyung Jun et.al. [WO2017111511A1] (Machine Translation) (Year: 2017).*
Search Report issued Jun. 26, 2023 for counterpart European Patent Application No. 20901021.4.
Chinese Office Action dated Feb. 7, 2023 issued in Chinese Patent Application No. 202080087113.3.
International Search Report dated Apr. 13, 2021 issued in International Patent Application No. PCT/KR2020/018330 (with English translation).

(Continued)

*Primary Examiner* — Brian D Walck
*Assistant Examiner* — Nazmun Nahar Shams
(74) *Attorney, Agent, or Firm* — Morgan Lewis & Bockius LLP

(57) ABSTRACT

An exemplary embodiment in the present disclosure provides a grain-oriented electrical steel sheet containing, by wt %: 3.0 to 4.5% of Si; 0.05 to 0.2% of Mn; 0.015 to 0.035% of Al; 0.0015% or less (excluding 0%) of C; 0.0015% or less (excluding 0%) of N; 0.0015% or less (excluding 0%) of S; and a balance of Fe and other unavoidable impurities, wherein the grain-oriented electrical steel sheet satisfies the following Relational Expressions 1 and 2:

$(W_{13/50}/W_{17/50}) \leq 0.57$     [Relational Expression 1]

$(W_{15/50}/W_{17/50}) \leq 0.76$     [Relational Expression 2]

where Wx/y represents a core loss value under conditions in which a magnitude of an applied magnetic field is x/10 T and a frequency is y Hz.

13 Claims, No Drawings

(56) References Cited

FOREIGN PATENT DOCUMENTS

| | | | |
|---|---|---|---|
| CN | 104726795 | A | 6/2015 |
| CN | 108350545 | A | 7/2018 |
| CN | 108431267 | A | 8/2018 |
| CN | 109402513 | A | 3/2019 |
| CN | 109906284 | A | 6/2019 |
| CN | 109957640 | A | 7/2019 |
| CN | 110114478 | A | 8/2019 |
| JP | H04-187721 | A | 7/1992 |
| JP | H06-220540 | A | 8/1994 |
| JP | 2000-144251 | A | 5/2000 |
| JP | 2001-158950 | A | 6/2001 |
| JP | 2008-156693 | A | 7/2008 |
| JP | 2008-261013 | A | 10/2008 |
| JP | 2009-270129 | A | 11/2009 |
| KR | 10-2013-0014889 | A | 2/2013 |
| KR | 10-2013-0071968 | A | 7/2013 |
| KR | 10-2014-0084898 | A | 7/2014 |
| KR | 10-2014-0127648 | A | 11/2014 |
| KR | 10-1751523 | B1 | 6/2017 |
| KR | 10-2018-0072106 | A | 6/2018 |
| KR | 10-2018-0073323 | A | 7/2018 |
| KR | 10-2018-0074077 | A | 7/2018 |
| KR | 10-2018-0107195 | A | 10/2018 |
| WO | 2017/145907 | A1 | 8/2017 |

OTHER PUBLICATIONS

Japanese Office Action dated Sep. 26, 2023 issued in Japanese Patent Application No. 2022-536951.

\* cited by examiner

GRAIN-ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/018330, filed on Dec. 15, 2020, which in turn claims the benefit of Korean Application No. 10-2019-0169752, filed on Dec. 18, 2019, the entire disclosures of which applications are incorporated by reference herein.

TECHNICAL FIELD

The present disclosure relates to a grain-oriented electrical steel sheet and a method for manufacturing the same.

BACKGROUND ART

A grain-oriented electrical steel sheet is a soft magnetic material that is composed of grains having a grain orientation of {100}<001>, so-called Goss orientation, and has excellent magnetic properties in a rolling direction.

In general, magnetic properties may be represented by a magnetic flux density and a core loss, and a high magnetic flux density may be obtained by precisely aligning the orientation of the grains to the {110}<001> orientation. An electrical steel sheet having a high magnetic flux density may implement not only a reduction in size of an iron core material of an electrical device, but also a reduction in hysteresis loss, such that miniaturization and an increase in efficiency of the electrical device may be simultaneously achieved. The core loss is power loss consumed as heat energy when an arbitrary alternating magnetic field is applied to the steel sheet, and varies greatly depending on a magnetic flux density and a sheet thickness of the steel sheet, the amount of impurities in the steel sheet, a specific resistance and a size of a secondarily recrystallized grain, and the like. As the magnetic flux density and the specific resistance are higher and the sheet thickness and the amount of impurities in the steel sheet are lower, the core loss is more reduced, such that the efficiency of the electrical device is increased.

In order to develop Goss orientation, control of components in a steelmaking process and conditions of various processes such as hot-rolling, hot-rolled sheet annealing, cold-rolling, primary annealing, and secondary annealing are required to be significantly precisely and strictly managed.

In particular, Goss orientation is grown in the secondary annealing process, and other grains whose growth is suppressed by inhibitor components dispersed in the steel sheet are eroded, and (110)<001> grains are preferentially grown (secondary recrystallization).

In general, in order to stably and strongly develop Goss orientation, it is known that it is preferable to raise a temperature to a secondary recrystallization start temperature at a slow rate in a temperature rising section.

However, when a temperature rising rate is reduced in the temperature rising in the secondary annealing process, a grain size in the Goss orientation is significantly coarsened. As the grain size in the Goss orientation is increased, eddy-current loss is increased due to an increase in a magnetic domain, which may cause deterioration of core loss properties.

In particular, as a magnitude of a magnetic field to be applied is decreased, the influence thereof is greatly exerted, such that an effect of diminishing the loss is more significantly increased in a range of 1.5 T or less where a transformer is actually operated rather than at a core loss value at 1.7 T at which properties of the grain-oriented electrical steel sheet are guaranteed.

Therefore, it may be difficult to manufacture a grain-oriented electrical steel sheet having excellent low magnetic field characteristics and a high magnetic flux density by simply reducing the temperature rising rate in the temperature rising in the secondary annealing process.

DISCLOSURE

Technical Problem

An aspect of the present disclosure is to provide a grain-oriented electrical steel sheet having excellent low magnetic field characteristics and high magnetic flux density, and a method for manufacturing the same.

Technical Solution

According to an exemplary embodiment in the present disclosure, a grain-oriented electrical steel sheet contains, by wt %: 3.0 to 4.5% of Si; 0.05 to 0.2% of Mn; 0.015 to 0.035% of Al; 0.0015% or less (excluding 0%) of C; 0.0015% or less (excluding 0%) of N; 0.0015% or less (excluding 0%) of S; and a balance of Fe and other unavoidable impurities, wherein the grain-oriented electrical steel sheet satisfies the following Relational Expressions 1 and 2:

$$(W_{13/50}/W_{17/50}) \leq 0.57 \quad \text{[Relational Expression 1]}$$

$$(W_{15/50}/W_{17/50}) \leq 0.76 \quad \text{[Relational Expression 2]}$$

where $W_{x/y}$ represents a core loss value under conditions in which a magnitude of an applied magnetic field is x/10 T and a frequency is y Hz.

According to another exemplary embodiment in the present disclosure, a method for manufacturing a grain-oriented electrical steel sheet includes: heating a steel slab containing, by wt %: 3.0 to 4.5% of Si; 0.05 to 0.2% of Mn; 0.015 to 0.035% of Al; 0.005 to 0.1% of C; 0.005% or less (excluding 0%) of N; 0.005% or less (excluding 0%) of S; and a balance of Fe and other unavoidable impurities; obtaining a hot-rolled sheet by hot-rolling the heated steel slab; obtaining a cold-rolled sheet by cold-rolling the hot-rolled sheet; subjecting the cold-rolled sheet to primary recrystallization annealing; and subjecting the cold-rolled sheet subjected to the primary recrystallization annealing to secondary recrystallization annealing, wherein the secondary recrystallization annealing includes temperature rising and soaking, the temperature rising includes primary temperature rising and secondary temperature rising, a primary temperature rising rate and a secondary temperature rising rate in the primary temperature rising and the secondary temperature rising satisfy the following Relational Expression 3, the primary temperature rising rate is 5 to 15° C./hr, and in the soaking, the cold-rolled sheet is maintained at 1,150° C. or higher for 10 hours or longer, (Primary temperature rising rate)≥2×(Secondary temperature rising rate).     [Relational Expression 3]

Advantageous Effects

As set forth above, according to an aspect of the present disclosure, it is possible to provide a grain-oriented electrical steel sheet having excellent low magnetic field characteristics and a high magnetic flux density, and a method for manufacturing the same.

BEST MODE FOR INVENTION

Hereinafter, a grain-oriented electrical steel sheet according to an exemplary embodiment in the present disclosure will be described. According to an exemplary embodiment in the present disclosure, a grain-oriented electrical steel sheet contains, by wt %: 3.0 to 4.5% of Si; 0.05 to 0.2% of Mn; 0.015 to 0.035% of Al; 0.0015% or less (excluding 0%) of C; 0.0015% or less (excluding 0%) of N; 0.0015% or less (excluding 0%) of S; and a balance of Fe and other unavoidable impurities, wherein the grain-oriented electrical steel sheet satisfies the following Relational Expressions 1 and 2:

$$(W_{13/50}/W_{17/50}) \leq 0.57 \quad \text{[Relational Expression 1]}$$

$$(W_{15/50}/W_{17/50}) \leq 0.76 \quad \text{[Relational Expression 2]}$$

where $Wx/y$ represents a core loss value under conditions in which a magnitude of an applied magnetic field is $x/10$ T and a frequency is $y$ Hz.

The grain-oriented electrical steel sheet of the present disclosure satisfies Relational Expressions 1 and 2, such that an excellent low magnetic field core loss may be secured, and an excellent magnetic flux density of 1.94 T (tesla) or more may be secured, and as a result, excellent magnetic properties may be secured.

In addition, in the grain-oriented electrical steel sheet of the present disclosure, an area ratio occupied by grains having a grain diameter of 100 mm or more based on a rolled surface is preferably 20% or less. When the grain diameter in the Goss orientation is increased, a magnetic domain spacing is increased, and magnetization characteristics at a low magnetic field are deteriorated, which may cause deterioration of the low magnetic field core loss. In particular, when a temperature rising rate is reduced in a secondary recrystallization annealing process, a temperature gradient occurs at an upper portion of a coil, and thus, a fraction of coarse grains having a grain size of 100 mm or more is increased. These coarse grains have a great influence on deterioration of the low magnetic field core loss. Therefore, the area ratio occupied by grains having a grain diameter of 100 mm or more based on the rolled surface is preferably 20% or less. The rolled surface described in the present disclosure refers to a sheet surface of a steel sheet.

Hereinafter, an exemplary embodiment of a method for manufacturing a grain-oriented electrical steel sheet of the present disclosure will be described. According to an exemplary embodiment in the present disclosure, a method for manufacturing a grain-oriented electrical steel sheet includes: heating a steel slab containing, by wt %: 3.0 to 4.5% of Si; 0.05 to 0.2% of Mn; 0.015 to 0.035% of Al; 0.005 to 0.1% of C; 0.005% or less (excluding 0%) of N; 0.005% or less (excluding 0%) of S; and a balance of Fe and other unavoidable impurities; obtaining a hot-rolled sheet by hot-rolling the heated steel slab; obtaining a cold-rolled sheet by cold-rolling the hot-rolled sheet; subjecting the cold-rolled sheet to primary recrystallization annealing; and subjecting the cold-rolled sheet subjected to the primary recrystallization annealing to secondary recrystallization annealing, wherein the secondary recrystallization annealing includes temperature rising and soaking, the temperature rising includes primary temperature rising and secondary temperature rising, a primary temperature rising rate and a secondary temperature rising rate in the primary temperature rising and the secondary temperature rising satisfy the following Relational Expression 3, the primary temperature rising rate is 5 to 15° C./hr, and in the soaking, the cold-rolled sheet is maintained at 1,150° C. or higher for 10 hours or longer, $$\text{(Primary temperature rising rate)} \geq 2 \times \text{(Secondary temperature rising rate)}. \quad \text{[Relational Expression 3]}$$

First, an alloy composition will be described. Unless specifically stated otherwise, a unit of the alloy composition of the grain-oriented electrical steel sheet to be described below refers to "wt %."

Si: 3.0 to 4.5%

Silicon (Si), which is an elemental composition of an electrical steel sheet, serves to improve a core loss by increasing a specific resistance of a material. When a content of Si is less than 3.0%, the specific resistance is reduced and an eddy current is increased, and thus, core loss properties are deteriorated. On the other hand, when the content of Si exceeds 4.5%, ductility and toughness of mechanical properties are reduced, such that sheet fracture occurs frequently during a rolling process, and weldability between the sheets is deteriorated when continuous annealing for commercial production is performed, resulting in deterioration of productivity. Therefore, the content of Si is preferably 3.0 to 4.5%. A lower limit of the content of Si is more preferably 3.1% and still more preferably 3.3%. An upper limit of the content of Si is more preferably 4.0% and still more preferably 3.8%.

Mn: 0.05 to 0.2%

Manganese (Mn) has an effect of reducing the core loss by reducing the eddy current loss by increasing the specific resistance in the same manner as Si, and also serves to form a grain growth inhibitor by forming a Mn-based compound through a reaction with S present in the steel or forming nitrides in the form of (Al, Si, Mn)N through a reaction with Al, Si, and N ions. When a content of Mn is less than 0.05%, the above effect may not be obtained, and when the content of Mn exceeds 0.2%, an austenite phase transformation ratio is increased during the secondary recrystallization annealing, such that a Goss texture may be severely damaged, resulting in rapid deterioration of magnetic properties. Therefore, the content of Mn is preferably 0.05 to 0.2%. A lower limit of the content of Mn is more preferably 0.08% and still more preferably 0.1%. An upper limit of the content of Mn is more preferably 0.18% and still more preferably 0.15%.

Al: 0.015 to 0.035%

Aluminum (Al) combines with N ions introduced by ammonia gas as an atmospheric gas during a decarburization annealing process to form nitrides in the form of AlN, and also combines with Si, Mn, and N ions present in a solid solution state in the steel to form nitrides in the form of (Al, Si, Mn)N, thereby serving as a grain growth inhibitor. When a content of Al is less than 0.015%, the above effect may not be obtained, and when the content of Al exceeds 0.035%, a significantly coarse nitride is formed, such that a grain growth inhibiting ability may be rapidly deteriorated. Therefore, the content of Al is preferably 0.015 to 0.035%. A lower limit of the content of Al is more preferably 0.023% and still more preferably 0.028%. An upper limit of the content of Al is more preferably 0.033% and still more preferably 0.031%.

C: 0.005 to 0.1%

Carbon (C), an austenite stabilizing element, is added into a slab to refine a coarse columnar structure generated in a continuous casting process and to suppress slab center segregation of S. In addition, carbon serves to accelerate work hardening of the steel sheet during cold-rolling, thereby promoting generation of secondary recrystallization nuclei in the {110}<001> orientation in the steel sheet. However, when a content of C is less than 0.005%, the above effect may not be sufficiently obtained, and when the content of C exceeds 0.1%, carbides inside the steel sheet may be increased, such that cold-rolling properties may be deteriorated. Therefore, the content of C is preferably 0.005 to 0.1%. A lower limit of the content of C is more preferably 0.03% and still more preferably 0.05%. An upper limit of the content of C is more preferably 0.8% and still more preferably 0.65%. Meanwhile, since C contained in the grain-oriented electrical steel sheet finally obtained causes magnetic aging, resulting in deterioration of the magnetic flux density and the low magnetic field characteristics, decarburization annealing is performed in the manufacturing process of the electrical steel sheet, and the content of C in the grain-oriented electrical steel sheet finally obtained through such decarburization annealing is preferably 0.0015% or less.

N: 0.005% or less (excluding 0%)

Nitrogen (N) is an important element that reacts with Si, Al, and Mn to form compounds such as AlN and (Al, Si, Mn)N, and may be contained in the slab in an amount of 0.005% or less. However, when the content of N exceeds 0.005%, surface defects such as a blister due to nitrogen diffusion are caused in a post-hot-rolling process, and rolling is not easy due to formation of excessive nitrides in a slab state, which may cause an increase in manufacturing costs. Therefore, the content of N is preferably 0.005% or less (excluding 0%). A lower limit of the content of N is more preferably 0.002% and still more preferably 0.003%. An upper limit of the content of N is more preferably 0.0045% and still more preferably 0.0040%. Meanwhile, the nitride for forming secondary recrystallization of the Goss texture is reinforced by performing a nitridation treatment for diffusing N ions into the steel by introducing ammonia gas into the atmospheric gas during the decarburization annealing process. In addition, since N is also an element causing magnetic aging and may cause deterioration of the magnetic flux density and the low magnetic field core loss properties, purification annealing is performed in the secondary annealing process, and the content of N in the grain-oriented electrical steel sheet finally obtained through such purification annealing is preferably 0.0015% or less.

S: 0.005% or less (excluding 0%)

Sulfur (S) is an element that is unavoidably contained in the manufacturing process. When a content thereof exceeds 0.005%, sulfur segregates in the center of the slab during casting to cause brittleness, and reacts with Mn in the steel to form a Mn-based sulfide, such that a microstructure becomes non-uniform and rolling properties are deteriorated. Therefore, the content of S is preferably 0.005% or less (excluding 0%). The content of S is more preferably 0.0045% or less and still more preferably 0.004% or less. Meanwhile, since S is also an element causing magnetic aging, purification annealing is performed in the secondary annealing process in order to improve the low magnetic field core loss properties, and the content of S in the grain-oriented electrical steel sheet finally obtained through such purification annealing is preferably 0.0015% or less.

The remaining alloy component of the steel slab used in the grain-oriented electrical steel sheet and the method for manufacturing a grain-oriented electrical steel sheet of the present disclosure is Fe, and may include other impurities unavoidably contained in the art.

First, a steel slab having the alloy composition as described above is heated. In the heating of the steel slab, a heating temperature may be 1,000 to 1,280° C. When the heating is performed within the above heating temperature range, coarse growth of the columnar structure of the slab is prevented, such that it is possible to prevent generation of cracks in the sheet during the hot-rolling process. When the heating temperature of the steel slab exceeds 1,280° C., it is difficult to sufficiently obtain the above effect, and when the heating temperature of the steel slab is lower than 1,000° C., precipitates formed in the casting process are not re-solid-dissolved in the slab heating process, and significantly coarse precipitates are formed after hot-rolling, which adversely affects the control of the structure and causes deterioration of the core loss. A lower limit of the heating temperature of the steel slab is more preferably 1,050° C. and still more preferably 1,100° C. An upper limit of the heating temperature of the steel slab is more preferably 1,250° C. and still more preferably 1,200° C.

Thereafter, the heated steel slab is hot-rolled to obtain a hot-rolled sheet. In the present disclosure, the hot-rolling temperature is not particularly limited, and a temperature range commonly used in the art may be applied. However, as an example, a finish temperature in the hot-rolling may be 950° C. or lower. When the finish temperature in the hot-rolling exceeds 950° C., after the hot-rolling is completed, a phase transformation may occur, which may cause deterioration of the texture. The hot-rolled sheet obtained by the hot-rolling may have a thickness of 1.5 to 5.5 mm.

After the hot-rolling, the hot-rolled sheet is water-cooled, and then, the cooled sheet may be coiled at 600° C. or lower. When the coiling temperature exceeds 600° C., the size of the precipitates formed inside the steel is increased, and thus, the magnetism may be deteriorated.

Meanwhile, the hot-rolled sheet may be subjected to annealing or may be subjected to cold-rolling without performing annealing, if necessary. When the hot-rolled sheet is subjected to annealing, the hot-rolled sheet may be heated to a temperature of 900° C. or higher, soaked, and then cooled to make the hot-rolled structure uniform.

Thereafter, the hot-rolled sheet is subjected to cold-rolling to obtain a cold-rolled sheet. The cold-rolling may be performed using a reverse rolling mill or a tandem rolling mill by a cold-rolling method such as one-time cold-rolling, several times of cold-rolling, or several times of cold-rolling including intermediate annealing. The cold-rolled sheet obtained by the cold-rolling may have a thickness of 0.1 to 0.5 mm. In addition, warm-rolling in which the temperature of the steel sheet is maintained at 100° C. or higher may be performed in the cold-rolling. In addition, a final reduction ratio through the cold-rolling may be 50 to 95%.

Thereafter, the cold-rolled sheet is subjected to primary recrystallization annealing. In the primary recrystallization annealing, primary recrystallization in which a nucleus of a Goss grain is generated is performed. In the primary recrystallization annealing, decarburization and nitridation of the steel sheet may be performed. For the decarburization and nitridation, the primary recrystallization annealing may be performed in a mixed gas atmosphere of water vapor, hydrogen, and ammonia. The primary recrystallization annealing may be performed for decarburization at a temperature of 850 to 950° C. in an atmosphere in which a dew-point temperature is 50 to 70° C. In the primary recrystallization annealing, when the dew-point temperature is lower than 50° C., decarburization ability is insufficient, and thus, carbon in the steel may not be sufficiently removed, and when the dew-point temperature exceeds 70° C., a large amount of Fe-based oxide layers are generated on the surface of the steel sheet, which may cause surface defects in the final product. When the primary recrystallization annealing temperature is lower than 850° C., recrystallized grains are finely grown, and grain growth force is increased, such that stable secondary recrystallization may not be performed, and when the primary recrystallization annealing temperature exceeds 950° C., recrystallized grains are coarsely grown, and the grain growth force is reduced, such that stable secondary recrystallization may not be performed. Meanwhile, in the primary recrystallization annealing, the annealing time is not particularly limited in the present disclosure, but may be generally controlled within 5 minutes in consideration of productivity. In the primary recrystallization annealing, nitrides, which are main precipitates, such as (Al, Si, Mn) N and AlN are formed by introducing N ions into the steel sheet using ammonia gas for nitrification. There is no problem in exerting the effects of the present disclosure in any of a method of performing a nitridation treatment after decarburization and recrystallization, a method of simultaneously performing decarburization and nitridation treatments, and a method of performing decarburization annealing after performing a nitridation treatment.

Thereafter, the cold-rolled sheet subjected to the primary recrystallization annealing is subjected to secondary recrystallization annealing. The secondary recrystallization annealing may be performed by a method of applying an annealing separator to the cold-rolled sheet subjected to the primary recrystallization annealing and then performing annealing. In the present disclosure, the type of the annealing separator is not particularly limited, and, for example, an annealing separator containing MgO as a main component may be used.

It is preferable that the secondary recrystallization annealing includes temperature rising and soaking, the temperature rising includes primary temperature rising and secondary temperature rising, and a primary temperature rising rate and a secondary temperature rising rate in the primary temperature rising and the secondary temperature rising satisfy the following Relational Expression 3. In addition, it is preferable that the primary temperature rising rate is 5 to 15° C./hr, a start temperature in the primary temperature rising is 700 to 800° C., a start temperature in the secondary temperature rising is 1,000 to 1,100° C., and the temperature rising rate in the secondary temperature rising is 7.5° C./hr or less.

(Primary temperature rising rate)≥2×(Secondary temperature rising rate).  [Relational Expression 3]

The reason for performing the temperature rising under two conditions of the temperature rising rates is as follows.

In the temperature rising, secondary recrystallization in the Goss orientation is performed, and as the temperature rising rate is slower, Goss grains close to the {110}<001> orientation are preferentially grown, such that an integration degree is increased and a magnetic flux density is increased. However, since the secondary recrystallization is performed at a low temperature, the grain size in the Goss orientation is increased and low magnetic field characteristics are deteriorated. Therefore, it is preferable to suppress coarsening of the grain size in the Goss orientation while increasing the integration degree in the Goss orientation by increasing the temperature rising rate in a low temperature range in which the growth of the Goss grains is not performed well due to precipitates such as AlN and by lowering the temperature rising rate in a high temperature range in which the growth of the Goss grains is performed well due to decomposition of AlN.

To this end, in the present disclosure, as described above, it is preferable that the temperature rising rate in the secondary recrystallization annealing is divided into two stages, the start temperature in the primary temperature rising is controlled to 700 to 800° C., and the start temperature in the secondary temperature rising is controlled to 1,000 to 1,100° C. When the start temperature in the primary temperature rising is lower than 700° C., the annealing time is increased, which may cause a deterioration of productivity, and when the start temperature in the primary temperature rising exceeds 800° C., the temperature is increased in a state in which moisture contained in the annealing separator is not sufficiently removed, which may cause deterioration of surface quality. When the start temperature in the secondary temperature rising is lower than 1,000° C., the size of the Goss grain is coarsened, such that the low magnetic field core loss properties are deteriorated. When the start temperature in the secondary temperature rising exceeds 1,100° C., the growth of the Goss orientation is already started before the temperature rising rate is changed, and the integration degree may not be controlled, such that high magnetic flux density characteristics may not be obtained.

The primary temperature rising rate is preferably 5 to 15° C./hr. When the primary temperature rising rate is less than 15° C./hr, the secondary recrystallization of the Goss grains is started at a significantly low temperature, such that the integration degree of the Goss grain orientation is deteriorated. When the primary temperature rising rate exceeds 15° C./hr, a temperature gradient in the coil is intensified, such that the fraction of the coarse grains may be increased. In addition, as shown in Relational Expression 3, it is preferable that the primary temperature rising rate is at least twice higher than the secondary temperature rising rate, and if that is not the case, the growth of the grains in the Goss orientation is actively generated due to a low temperature rising rate, such that stable secondary recrystallization may not be performed.

In the soaking in the secondary recrystallization annealing, the cold-rolled sheet may be maintained at 1,150° C. or higher for 10 hours or longer. The soaking is performed to remove C, N, and S that are distributed in the steel and cause magnetic aging. In order to improve the low magnetic field characteristics, the content of each component needs to be lowered to 0.0015 wt % or less. In the soaking, when the soaking temperature is lower than 1,150° C. or the soaking time is shorter than 10 hours, it is difficult to control the contents of C, N, and S.

Thereafter, an insulation coating film may be formed on a surface of the grain-oriented electrical steel sheet obtained as described above, if necessary. As the example of the insulation coating film, a forsterite coating film may be used.

MODE FOR INVENTION

Hereinafter, the present disclosure will be described in more detail with reference to Examples. However, the following Examples are provided to illustrate and describe the present disclosure in more detail, but are not intended to limit the scope of the present disclosure.

Example 1

A steel slab containing, by wt %, 3.15% of Si, 0.052% of C, 0.105% of Mn, 0.028% of Al, 0.0045% of N, 0.0045% of S, and a balance of Fe and other impurities was prepared. The steel slab was heated at 1,150° C., and then, the heated steel slab was hot-rolled to a thickness of 2.6 m, thereby manufacturing a hot-rolled sheet. The hot-rolled sheet was heated at a temperature of 1,050° C. or higher, the hot-rolled sheet was maintained at 910° C. for 90 seconds, and the hot-rolled sheet was water-cooled and then pickled. Subsequently, the hot-rolled sheet was cold-rolled to a thickness of 0.27 mm using a reverse rolling mill to manufacture a cold-rolled sheet. The cold-rolled sheet was maintained at 860° C. in a dew-point temperature atmosphere of 65° C. for 120 seconds, and the cold-rolled sheet was subjected to primary recrystallization annealing. Then, MgO was applied, the cold-rolled sheet was coiled in a coil shape, and the coiled cold-rolled sheet was subjected to secondary recrystallization annealing. In this case, in the heating at a temperature from 750° C. to 1,210° C. in the secondary recrystallization annealing, primary and secondary temperature rising rates were controlled as shown in Table 1, soaking was performed by maintaining the cold-rolled sheet at 1,210° C. for 20 hours, and then, the cold-rolled sheet was furnace-cooled, thereby manufacturing a grain-oriented electrical steel sheet. In an alloy composition of the grain-oriented electrical steel sheet manufactured as described above, 3.15% of Si, 0.0012% of C, 0.105% of Mn, 0.028% of Al, 0.001% of N, and 0.001% of S were contained. A magnetic flux density and a core loss of the grain-oriented electrical steel sheet manufactured as described above were measured. The results thereof are shown in Table 1.

The magnetic properties were measured using the Epstein measurement method, the magnetic flux density was measured as a magnitude (Tesla) of a magnetic flux density induced in a magnetic field of 800 A/m, and the core loss was measured under conditions of a magnitude of an applied magnetic field of each of 1.3 T, 1.5 T, and 1.7 T and a frequency of 50 Hz.

TABLE 1

| Specimen No. | Primary temperature rising rate (° C./hr) | Secondary temperature rising rate (° C./hr) | Secondary temperature rising start temperature (° C.) | Magnetic flux density ($B_8$, Tesla) | Core loss (W13/50, W/kg) | Core loss (W15/50, W/kg) | Core loss (W17/50, W/kg) | Remark |
|---|---|---|---|---|---|---|---|---|
| 1 | 3 | 6 | 1050 | 1.865 | 0.583 | 0.761 | 0.965 | Comparative Example 1 |
| 2 | 8 | 3 | 1030 | 1.942 | 0.481 | 0.642 | 0.865 | Inventive Example 1 |
| 3 | 8 | 3 | 1150 | 1.928 | 0.545 | 0.711 | 0.920 | Comparative Example 2 |
| 4 | 8 | 6 | 820 | 1.905 | 0.538 | 0.705 | 0.918 | Comparative Example 3 |
| 5 | 10 | 4 | 950 | 1.943 | 0.513 | 0.684 | 0.876 | Comparative Example 4 |
| 6 | 10 | 4 | 1010 | 1.945 | 0.486 | 0.627 | 0.872 | Inventive Example 2 |
| 7 | 10 | 5 | 1045 | 1.951 | 0.461 | 0.639 | 0.854 | Inventive Example 3 |
| 8 | 10 | 12 | 1045 | 1.916 | 0.534 | 0.702 | 0.907 | Comparative Example 5 |
| 9 | 13 | 3 | 1080 | 1.943 | 0.483 | 0.652 | 0.868 | Inventive Example 4 |
| 10 | 13 | 6 | 1025 | 1.948 | 0.487 | 0.643 | 0.863 | Inventive Example 5 |
| 11 | 18 | 8 | 1120 | 1.921 | 0.532 | 0.699 | 0.911 | Comparative Example 6 |
| 12 | 20 | 5 | 1010 | 1.942 | 0.517 | 0.682 | 0.869 | Comparative Example 7 |
| 13 | 8 | 8 | — | 1.883 | 0.578 | 0.748 | 0.971 | Comparative Example 8 |
| 14 | 12 | 12 | — | 1.911 | 0.535 | 0.713 | 0.913 | Comparative Example 9 |

As shown in Table 1, it could be confirmed that in the cases of Inventive Examples 1 to 5 in which the temperature rising rate in the secondary crystallization annealing was divided into two stages, and the primary and secondary temperature rising rates and the start temperature in the secondary temperature rising were appropriately controlled as suggested by the present disclosure, the low magnetic field core loss was excellent and the magnetic flux density ($B_8$) was 1.94 T or more.

On the other hand, it could be confirmed that in the cases of Comparative Examples 1 to 9 in which the conditions suggested by the present disclosure were not satisfied, a magnetic flux density ($B_8$) of 1.94 T or more was not secured, or the low magnetic field core loss was deteriorated in spite of a high magnetic flux density ($B_8$).

Example 2

A part of the grain-oriented electrical steel sheet manufactured by Example 1 was immersed in hydrochloric acid heated to a concentration of 20 vol % and 50° C. for 10 minutes to remove the base coating formed on the surface, and the grain diameter of the grain was measured. The results thereof are shown in Table 2.

TABLE 2

| Specimen No. | Area ratio occupied by grains (coarse grains) having grain diameter of 100 mm or more based on rolled surface (%) | Remark |
| --- | --- | --- |
| 2 | 9 | Inventive Example 1 |
| 5 | 23 | Comparative Example 4 |
| 6 | 14 | Inventive Example 2 |
| 7 | 7 | Inventive Example 3 |
| 9 | 11 | Inventive Example 4 |
| 12 | 26 | Comparative Example 7 |

As shown in Table 2, it could be confirmed that in the cases of Inventive Examples 1 to 4 in which the conditions suggested by the present disclosure were satisfied, an area ratio occupied by grains (coarse grains) having a grain diameter of 100 mm or more based on a rolled surface was 20% or less. On the other hand, it could be confirmed that in the cases of Comparative Examples 4 to 7 in which the conditions suggested by the present disclosure were not satisfied, the area ratio occupied by the grains (coarse grains) having a grain diameter of 100 mm or more based on the rolled surface exceeded 20%.

The invention claimed is:

1. A grain-oriented electrical steel sheet comprising, by wt %: 3.0 to 4.5% of Si; 0.05 to 0.2% of Mn; 0.015 to 0.035% of Al; 0.0015% or less (excluding 0%) of C; 0.0015% or less (excluding 0%) of N; 0.0015% or less (excluding 0%) of S; and a balance of Fe and other unavoidable impurities, wherein the grain-oriented electrical steel sheet satisfies the following Relational Expressions 1 and 2:

$(W_{13/50}/W_{17/50}) \leq 0.57$     [Relational Expression 1]

$(W_{15/50}/W_{17/50}) \leq 0.76$     [Relational Expression 2]

where Wx/y represents a core loss value under conditions in which a magnitude of an applied magnetic field is x/10 T and a frequency is y Hz.

2. The grain-oriented electrical steel sheet of claim 1, wherein a magnetic flux density of the grain-oriented electrical steel sheet is 1.94 T or more.

3. The grain-oriented electrical steel sheet of claim 1, wherein an area ratio occupied by grains having a grain diameter of 100 mm or more based on a rolled surface is 20% or less.

4. A method for manufacturing a grain-oriented electrical steel sheet, the method comprising:
heating a steel slab containing, by wt %: 3.0 to 4.5% of Si; 0.05 to 0.2% of Mn; 0.015 to 0.035% of Al; 0.005 to 0.1% of C; 0.005% or less (excluding 0%) of N; 0.005% or less (excluding 0%) of S; and a balance of Fe and other unavoidable impurities;
obtaining a hot-rolled sheet by hot-rolling the heated steel slab;
obtaining a cold-rolled sheet by cold-rolling the hot-rolled sheet;
subjecting the cold-rolled sheet to primary recrystallization annealing; and
subjecting the cold-rolled sheet subjected to the primary recrystallization annealing to secondary recrystallization annealing,
wherein the secondary recrystallization annealing includes temperature rising and soaking,
the temperature rising includes primary temperature rising and secondary temperature rising,
a primary temperature rising rate and a secondary temperature rising rate in the primary temperature rising and the secondary temperature rising satisfy the following Relational Expression 3,
the primary temperature rising rate is 5 to 15° C./hr, and in the soaking, the cold-rolled sheet is maintained at 1,150° C. or higher for 10 hours or longer, (Primary temperature rising rate)≥2×(Secondary temperature rising rate)     [Relational Expression 3].

5. The method for manufacturing a grain-oriented electrical steel sheet of claim 4, wherein in the heating of the steel slab, a heating temperature is 1,000 to 1,280° C.

6. The method for manufacturing a grain-oriented electrical steel sheet of claim 4, wherein in the hot-rolling, a finish temperature is 950° C. or lower.

7. The method for manufacturing a grain-oriented electrical steel sheet of claim 4, further comprising, after the obtaining of the hot-rolled sheet, water-cooling the hot-rolled sheet, and then, coiling the cooled sheet at 600° C. or lower.

8. The method for manufacturing a grain-oriented electrical steel sheet of claim 4, further comprising, after the obtaining of the hot-rolled sheet, annealing the hot-rolled sheet at 900° C. or higher.

9. The method for manufacturing a grain-oriented electrical steel sheet of claim 4, wherein the primary recrystallization annealing is performed at a temperature of 850 to 950° C. in an atmosphere in which a dew-point temperature is 50 to 70° C.

10. The method for manufacturing a grain-oriented electrical steel sheet of claim 4, wherein in the primary temperature rising, a start temperature is 700 to 800° C.

11. The method for manufacturing a grain-oriented electrical steel sheet of claim 4, wherein in the secondary temperature rising, a start temperature is 1,000 to 1,100° C.

12. The method for manufacturing a grain-oriented electrical steel sheet of claim 4, wherein in the secondary temperature rising, a temperature rising rate is 7.5° C./hr or less.

13. The method for manufacturing a grain-oriented electrical steel sheet of claim 4, further comprising, after the secondary recrystallization annealing, forming an insulation coating film on a surface of the cold-rolled sheet subjected to the secondary recrystallization annealing.

* * * * *